Oct. 6, 1970  W. H. ABILDGAARD ET AL  3,532,363
PLASTIC BOOKBINDING APPARATUS AND METHOD
Filed May 20, 1968  7 Sheets-Sheet 2

INVENTOR.
WILLIAM H. ABILDGAARD
CHARLES T. GROSWITH III
BY
Julian Caplan
ATTORNEY

Oct. 6, 1970      W. H. ABILDGAARD ETAL      3,532,363
PLASTIC BOOKBINDING APPARATUS AND METHOD

Filed May 20, 1968      7 Sheets-Sheet 3

INVENTOR.
WILLIAM H. ABILDGAARD
CHARLES T. GROSWITH III
BY
Julian Caplan
ATTORNEY

United States Patent Office 3,532,363
Patented Oct. 6, 1970

3,532,363
PLASTIC BOOKBINDING APPARATUS AND METHOD
William H. Abildgaard, Los Altos Hills, Calif. (% Abildgaard Laboratories, 875 Maude Ave., Mountain View, Calif. 94040), and Charles T. Groswith III, Los Altos, Calif.; said Groswith assignor to said Abildgaard
Filed May 20, 1968, Ser. No. 730,422
Int. Cl. B42d 3/02; B43c 15/00
U.S. Cl. 281—29      14 Claims

ABSTRACT OF THE DISCLOSURE

The plastic cover of a book is formed in place from a plastisol and bonded to the spine of the book. Apparatus comprises a platen upon which the plastisol is poured and which may support a casting release paper suitably inked with a transfer pattern and textured, the platen being provided with suitable bottom heating means and cooling means; a frame which carries an edge fence which is pressed into contact with the platen so that the fence defines and preferably becomes part of the cover; an upper heater cover which cooperates with the bottom heating means in curing the plastisol poured on top of the platen and confined by the fence; and a book clamp which holds the book, pages or sheets while they are heat bonded to one another and to the cover. Provision is made for adjustment for page dimensions and spine thickness. Ring or other binding means may be used in lieu of heat bonding the pages to the cover. The method consists in pouring a plastisol on a patterned, reverse-lettered casting release paper or on a platen, the spread of plastisol being confined by an extensible mold fence which preferably becomes part of the cover, curing the plastisol, applying an adhesive bonding strip to the cover, heating the strip and pressing the edges of the pages into the adhesive until they are bonded to themselves and to the cover. A hinge in the cover and adhesive material is simultaneously thermoformed during the bonding procedure. An alternate method utilized the melting of a solid thermoplastic material for the cover instead of vinyl plastisol. In the alternate method the cover material may also function as the paper adhesive thus eliminating an intermediate material for bonding the cover to the pages.

---

This invention relates to apparatus and method for forming a book and to the book produced thereby. More specifically, the invention relates to apparatus of the simple office-machine type requiring only a moderate amount of skill and training of the operator, which may be used to mold a cover for a plurality of sheets of material, secure the spine or edge of the sheets to themselves and to the cover and thereby produce a custom-made covered book within a short space of time and at a low cost of material and labor. In essence, the invention involves in rapid sequence and in a single machine the steps of molding a plastic, leather-like cover, imprinting the same with desired graphic and ornamental material, binding loose or joined pages to themselves and to the cover while forming a suitable hinge in the cover and thus producing the book.

One object of the invention is to provide in the above apparatus a method for variations in page size and spine thickness.

A further object of the invention is to provide for variations in the surface texture, color and flexibility of the cover, and also to provide for transfer of decorative and printed material to the cover surface during the molding step.

A feature of novelty of the present invention is the fact that the cover may be produced in a very short period of time, such as two to five minutes.

A further object of the invention is to provide apparatus and method for rebinding and cover application to magazines, periodicals, paper-back books, and for replacement of hard-cover book bindings.

A still further object of the invention is to enable the user to attach during the moulding cycle a suitable mechanical device, such as a ring binder to the cover so that the equivalent of the loose-leaf book is produced.

A feature of the invention is to provide a novel stretchable fence which defines the dimensions of the cover and is variable for page size and for spine thickness of the book. A rounded edge and rounded corners result from this means. This object of the invention is accomplished by using a composite mold in which the defining edges of the mold are separate and distinct from the textured flat surfaces heretofore described, and which become of themselves the defining edges of the product. This molded and stretchable fence may or may not be similar in material or color to the cover, but when the cover is molded thereto the fence becomes an integral part thereof.

Another feature of the invention is the fact that the fence reinforces the rim of the cover exactly where the cover normally tears, which is especially near the spine in the hinge area.

Another feature of the invention is the liquid vinyl plastisol casting technique which makes possible as on-the-spot method suitable for job shops, book rebinding facilities and offices. A quantity of plastisol is poured onto the platen of the machine and flows to fill the dimensions of the fence and thus allows for easy and low pressure transfer to the cover of texture, pattern and graphic arts. Preferably a unit measure of plastisol may be used to accommodate a wide range of page sizes with only negligible variations in cover thickness.

The angle plates of the sheet holder may be textured to thermoform the inside cover when the paper is embedded and the hinge formed. Thus the upper platen may be made to texture the inside of the cover to simulate the lining of an expensively bound book or to laminate decorative or stiffening material to the hot top surface of the cover.

Another feature of the invention is the use of an intermediate material, which is capable of strongly binding paper-to-paper and paper-to-plastic. A hinge is formed through the intermediate material, which hinge coincides with the spine thickness of the material being covered. Excess intermediate material is absorbed into the book cover, thus eliminating the necessity of slitting the intermediate material for varying spine thicknesses.

Another feature of the invention is the provision of mechanical means to implant the edges or spine of the paper, which means also forms the hinge in correct position with relation to both the pages and cover. The intermediate adhesive material serves to reinforce the potentially weak hinge of a standard cloth or plastic cover.

Another feature of the invention is the optional use of either a disposable (paper or foil) or a non-disposable bottom mold which is either predecorated or blank.

Other objects of the present invention will become apparent upon reading the following specification and referring to the accompanying drawings.

THE APPARATUS

The apparatus which is the subject of this invention is of a type which is compact, easily operated with a minimum of skill and training and generally similar to an office copying machine in size. It will be understood that the construction of the apparatus herein illustrated is subject to wide variation in details.

The machine has a base 21 provided with a bottom heater 22. Hingedly connected to base 21 is a frame 23 for the fence which determines the cover dimensions. Also hingedly connected to base 21 is an upper heater member 24 used in curing the plastisol used to form the cover and also to melt the adhesive strip which binds the spine of the book to the cover. Still another member hinged to base 21 is the page clamp 26 which clamps the pages together preparatory to implanting in the intermediate binding strip and is used to apply pressure to force the spine of the book into the strip. Various of the parts are adjustable to accommodate different dimensions.

Figures 1, 2:
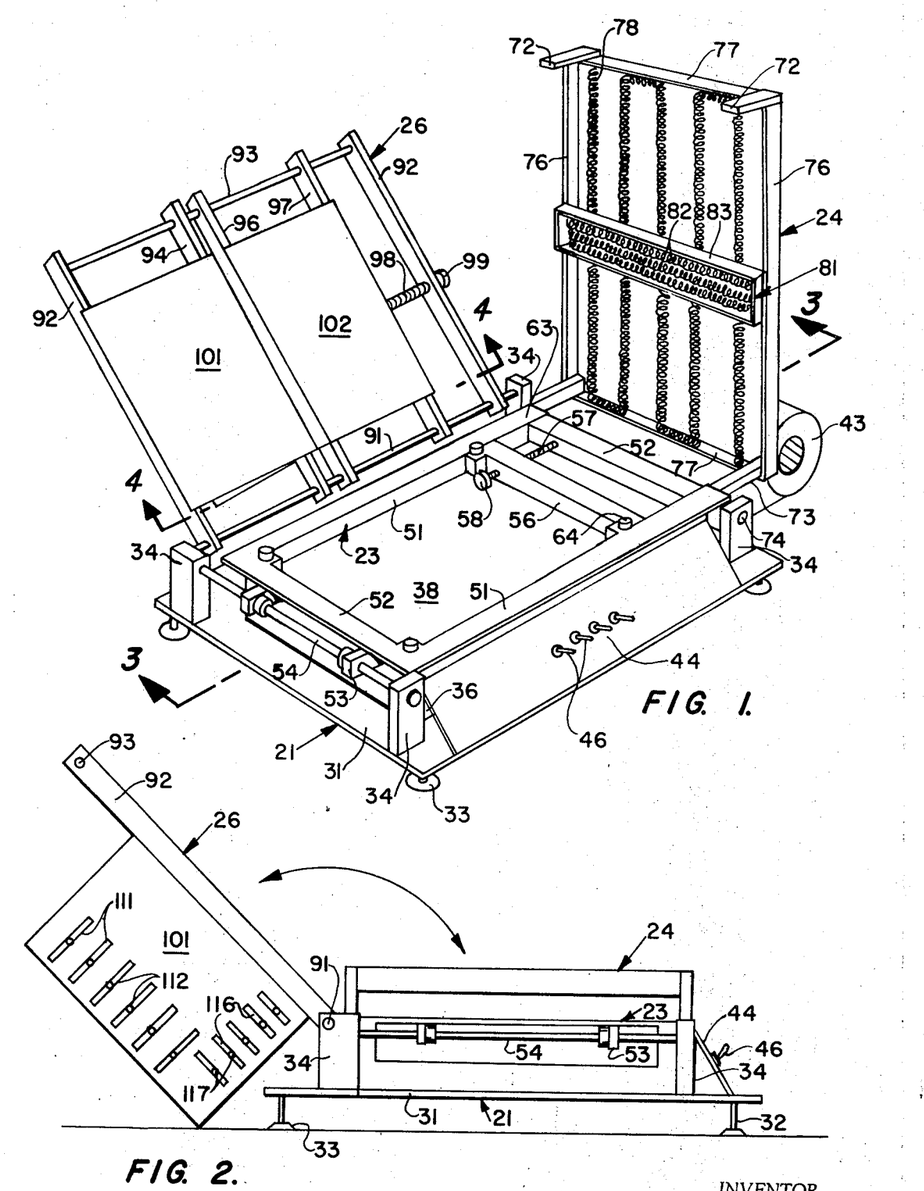
FIG. 1 is a perspective view showing the apparatus of the present invention.
FIG. 2 is an end elevational view of a portion of the structure of FIG. 1.
Figure 3:
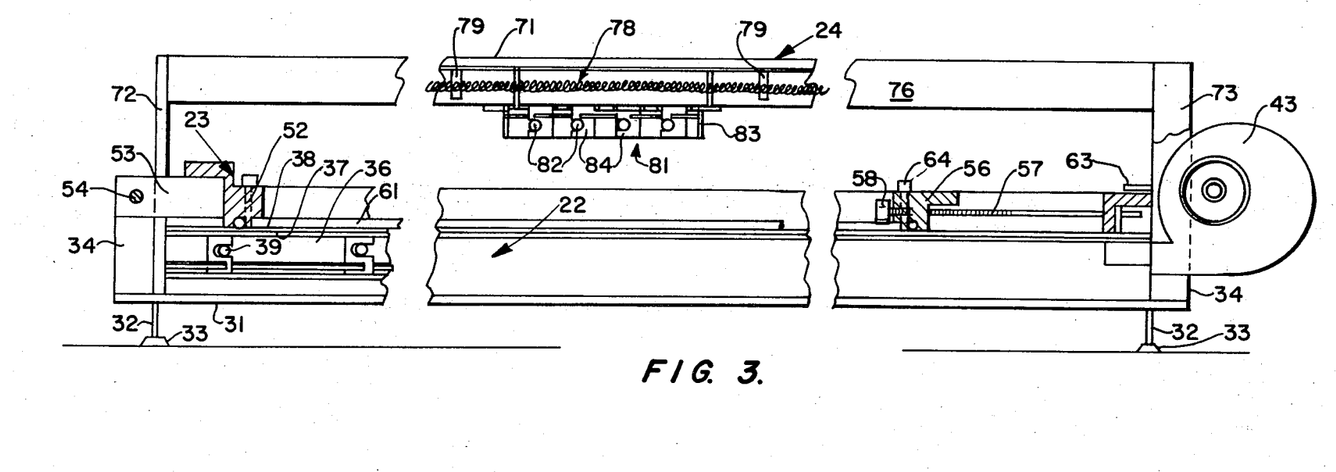
FIG. 3 is a sectional view taken substantially along the line 3—3 of FIG. 1, partially broken away to conserve space and to reveal internal construction.

Base 21 has a bottom plate 31 from which depend feet 32 having adjustable pads 33 on their lower ends resting upon the surface which supports the machine so that base is level. At the four corners of the machine are legs 34 which project up from plate 31 and extending horizontally-transversely between the front legs and the bottom legs are vertical side frames 36. Directing attention particularly to FIGS. 3 and 3A, horizontal grooves 37 are formed adjacent the top edges of side frames 36. Platen 38 slides inward from the left-hand end of the machine as viewed in FIG. 1, its margin being supported in grooves 37. The top surface of platen 38 may be smooth, or it may be textured in an imitation leather grain or other pattern. In the use of the machine, the plastisol may be poured directly upon the top of platen 38, or a sheet of textured and reverse imprinted casting release paper may be positioned on the platen. In any event, the platen performs the function of acting as, or supporting the bottom of, the mold which becomes the outside of the cover of the book. Immediately below platen 38 are electric heating elements 39 supported by S-shaped ceramic clips 41 which are spaced at intervals below the platen and held in position by a perforated horizontal plate 42 attached to the sides 36. Heat insulation 43 and a reflector 44 are located below the heating elements 39 to direct heat upwardly against platen 38 and minimize heat transmission below the base.

Positioned at the right-hand end of base 21 is an air blower 43 used to force air into the space between plate 31 and platen 38 at the conclusion of the heating cycle. A control panel 44 may be mounted on the front of base 21 having various manual or automatic controls 46 governing energization of the heaters, blower, etc.

Fence mounting frame 23 has side and end members 51, 52 forming a box open at top and bottom. At the left end are projecting lugs 53 apertured to receive horizontal transverse shaft 54 fixed to the left legs 34 of base 21. Thus the fence frame 23 may be pivoted about the axis of shaft 54 from the operative position shown in FIGS. 1 and 3, to an inoperative position pivoted counterclockwise relative to FIG. 1. As illustrated, frame 23 is adjustable to accommodate page width and spine thickness variations. It is apparent, however, that with simple modification frame 23 may also be used to accommodate variations in page length. To accommodate the width and spine variations, a transverse movable frame member 56 is slidable between the side members 51. Threaded shafts 57 extend through threaded apertures in slidable frame member 56, shafts 57 being journaled in right-hand end member 52. By turning knob 58 on shaft 57, the movable frame member 56 may be moved toward and away from the left-hand end member 52.

Figure 5:
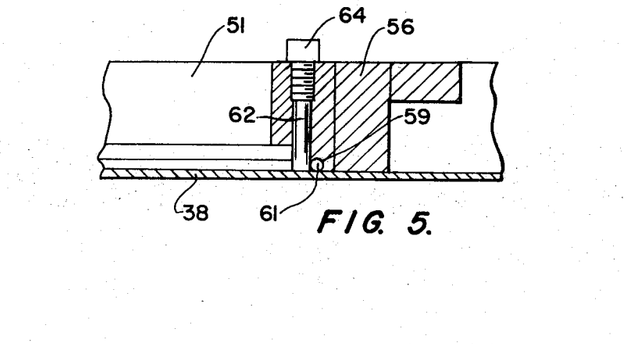
FIG. 5 is a fragmentary, enlarged sectional view of a portion of FIG. 3.

The underside or left-hand end 52, front and back sides 51 and movable frame member 56 are each undercut with a rabbet 59. In the use of the apparatus, a stretchable plastic continuous loop 61 which has been referred to as a stretchable fence, fits into the rabbet. The fence is held in place while the fence frame 23 is in inoperative position by four corners pins 62 which, in operative position, are threaded over part of their length and vertically slidable. In extended position is shown in FIG. 5, pins 62 hold fence 61 within rabbet 59 at each of its four corners. When the movable fence member is adjusted in position, the stretchability of the fence accommodates considerable variations in overall width of the cover to be formed. When the fence frame has been positioned over the platen and forced downward, being held in place by clamps 63, the friction of fence 61 against platen 38 or the casting release paper on the platen prevents the fence from contracting. Hence pins 62 are retracted by turning their knobs 64 which screw the pins up and above the level of fence 59. Retracting the pins in this manner prevents the pins from forming holes in the cover subsequently formed. When the plastisol is poured within frame 23 above platen 38 or casting release paper 126, the fence limits the dimensions of the cover which is molded.

Figure 3A:
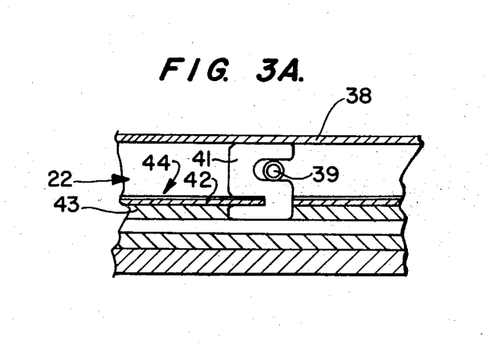
FIG. 3A is an enlarged fragmentary view of a portion of the structure of FIG. 3.

Top heater frame 24 has a top cover 71 and depending left and right legs 72, 73 and shorter sides and ends, 76, 77. The right-hand legs 73 are apertured at their lower end to receive horizontal transverse shaft 74 which also passes through the right-hand legs 34 of base 21, thus pivotally mounting top heated element 24 on base 21. Legs 72 rest upon the top of left legs 34, thus supporting the top cover 71 horizontal. Below top cover 71 are primary heating elements 78 similar to elements 39 and held in place by clips 79 similar to clips 41. The means of attachment and insulation are substantially the same as the case of the bottom heater elements which are illustrated in FIG. 3A.

Also attached to the top heater member is a supplemental heater 81 having heating coils 82 which extend transversely across the machine for the purpose of heating the hot melt adhesive strip 133 which has heretofore been mentioned. The supplemental heating coils 82 are contained within a rectangular transverse frame 83 which is attached to side 76. Clips 84 similar to clips 41 support the heating coils 82. Since the machine is adjustable for various page widths and spine thicknesses, heater 81 may be made adjustably positioned longitudinally of member 24, so that it is centered relative to the distance between left member 52 and member 56.

Page clamp frame 26 is pivotally mounted on base 21 by means of longitudinal horizontal shaft 91 which is journaled in the back legs 34. Transverse end bars 92 are pivoted at their back ends to shaft 91 and at their front ends are interconnected by longitudinal rod 93. Intermediate fixed transverse bar 94 extends between shaft 91 and rod 93. First and second movable bars 96, 97 slide on shaft 91 and rod 93. Threaded shaft 98 journaled in the right-hand end bar 92 extends through a threaded aperture in second movable bar 97.

Figures 4, 4A, 6, 7:
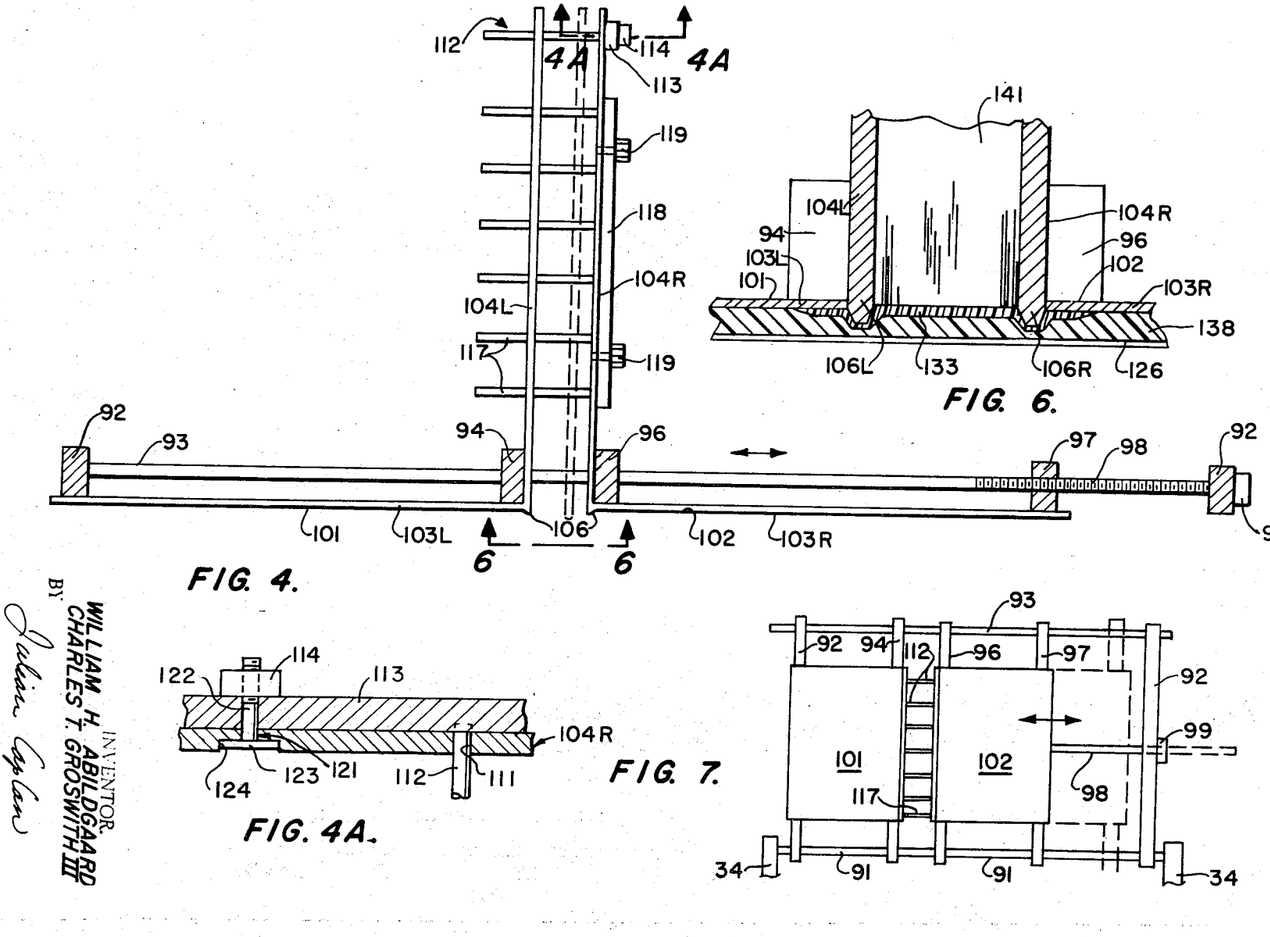
FIG. 4 is a sectional view taken substantially along the line 4—4 of FIG. 1.
FIG. 4A is a fragmentary sectional view of a detail of FIG. 4 along line 4A—4A of FIG. 4.
FIG. 6 is an enlarged fragmentary view of a portion of FIG. 4, as viewed along the line 6—6 of FIG. 4.
FIG. 7 is a plan view of the page clamp, showing adjustable features thereof.

Fixed angle-shaped plate 101 on the left hand of the machine is supported by end bar 92 and left-hand intermediate bar 94 and is stationary. Movable angle plate 102 is supported by bars 96, 97 and thus by turning knob 99 on shaft 98, movable plate 102 is moved toward and away from stationary plate 101. Each plate 101, 102 has a flange 103 which in operative position of clamp 26 is horizontal and immediately above platen 38 and a transverse flange 104. The surfaces of flanges 103 and 104 are preferably coated by material such as Teflon so that the plastisol does not stick thereto. The bulk of plates 101, 102 makes them function as a heat sink in the cooling process. In order to form the hinge of the cover as hereinafter explained, transverse ridges 106 are formed at the angles of the angle plates, said ridges being generally V-shaped, as best shown in FIG. 6, and likewise coated by a material such as Teflon so that the adhesive binding strip does not stick thereto.

To square the paper in page clamp 26, a first series of slots 111 is formed in flanges 104 which in the operative position of the clamp frames are transverse. Extending between the flanges 104 and through slots 111 are pins 112, one end of each of which is fixed to the movable bar 113 which may be adjustable locked on flange 104R by nut 114. Thus the inner surface of flange 104R (as shown in FIG. 4A) is formed with a slot 121 parallel to slots 111. A screw 122 having an enlarged head 123 sides in slot 121, head 123 fitting in recess 124 surrounding slot 121. Nut 114 tightens the assembly in position. Thus as the pages of the book are inserted between flanges 104 when the clamp is in the inoperative position shown in FIG. 1, the remote edges of the pages contact pins 112 to square the outer edges of the pages. By moving bar 113 inward-outward, the inner edges of the pages may be brought approximately flush with the surfaces of flanges 103. Horizontal slots 116 are also formed in flanges 104 and are provided with pins 117 similar to pins 112. Pins 117 are fixed to adjustable bar 118 which is in turn secured to flange 104R with nuts 119. The adjustment of pins 117 is similar to that of pins 112 and hence not illustrated or described in detail. Pins 117 also square the top edges of the book pages.

By adjustment of the position of pins 112 and pins 117, the spine edges may be positioned flush with flanges 103 and the length of the pages centered (or otherwise positioned) relative to the length of the cover. Shaft 98 is then turned so that flanges 104 are moved together to clamp the pages in position.

The use of the apparatus is described in detail in connection with the description of the method which is set forth at a later point in the specification.

MATERIALS

One of the optional materials used in the practice of the method hereinafter described is a casting release paper 126. Such paper has the characteristics that plastisol cured thereupon will part from the paper after curing and cooling. Such papers are commercially produced by S. D. Warren, Division of Scott Paper Company, and others, are readily commercially available and their composition forms no part of the present invention. Various textures 127 are imparted to the paper during manufacture, such as various leather grain simulations and these are imparted to the outside of the cover. For ornamental purposes, decorative borders 128 and the like, and names and other legends 129 may be silk-screened or otherwise applied onto the casting release paper in reverse printing and such material is absorbed into the plastisol and ornaments the cover. By techniques well known in the transfer art, legends may be typed onto a transparent plastic material and affixed to the casting release paper, the transparent plastic and art thereon becoming molded in to the finish product surface.

The fence 61 is another of the raw materials. Such fence is preferably a continuous loop of material circular in cross-section with a diameter of about 1/16" to 1/8" formed of a polyvinyl material which may be the same color as the cover and thus must be compatible with the plastisol or other material of which the cover is made. It reinforces the potentially weak edge of the cover, which is particularly useful in the hinge area, a normally weak zone.

The plastisol 132 used to form the cover is subject to considerable variation. A polyvinyl material is desirable but not mandatory. Its flexibility (i.e., hardness) may be adjusted by variation in its composition. A foam may be formed therein by well-known formulation techniques. The texture is subject to considerable variation. The degree of flexibility or hardness of the cover is controllable over a wide range by variation in the plasticizer-resin ratio and the use of conventional fillers common to established plastisol compounding techniques. One such formula which works well and produces a cover with a Shore A scale durometer hardness of approximately 85 is as follows:

Formula 113

| | Parts |
|---|---|
| Vinyl dispersion resin #1716 (Tenneco Chemicals, Inc.) | 50 |
| Vinyl dispersion blending resin #744 (Diamond Alkali Company) | 50 |
| | 100 |
| Dioctyl adipate (DOA) plasticizer (Tenneco Chemicals, Inc.) | 25 |
| Epoxy tallate plasticizer #850 (Tenneco Chemicals, Inc.) | 10 |
| Barium-cadmium liquid stabilizer (Tenneco Chemicals, Inc.) | 2 |
| | 37 |

Vinyl pigment as required for color.

Further technical information regarding the above-mentioned components may be derived from technical data bulletins provided by the manufacturers thereof. For purpose of brevity, and because complete details are not furnished by the manufacturers and further because variations in ingredients are quite possible in the practice of the invention, complete details are not set forth herein. To enable one skilled in this art to practce this invention, the foregong description should be sufficient. To supplement such description, reference is made to available manufacturer's data, and copies of such data are filed as exhibits to this specification, as per the following table:

TABLE

| Item | Manufacturer's bulletin | Date | Ex. |
|---|---|---|---|
| Vinyl dispersion resin #1716 | Tenneco 1716 dispersion resin | May 1966 | 1 |
| Vinyl dispersion blending resin #744 | Diamond PVC-7-44 | February 1963 | 2 |
| Dioctyl adipate | Nuoplaz-Nuodex Plasticizers, pp. 6, 7. | October 1966 | 3A |
| Alternate dioctyl adipate | Union Carbide Flexol Plasticizer A-26 Flexol. | July 1965 | 3B |
| Alternate | FMC Organic Chemicals Division—Plasticizers & Phosphorous Chemicals, p. 58, Adipol DOA. | | 3C |
| Epoxy tallate | #850 Nuoplaz Nuodex Plasticizers, pp. 10, 11 | October 1966 | 4A |
| Epoxy tallate (alternate) | Union Carbide Flexol Plasticizer, EP-8. | June 1966 | 4B |
| Barium-cadmium liquid stabilizer | Nuodex, Nuostabe V-1255 | | 5 |
| Vinyl pigment | Claremont Polychemical Corp. "K" series. | | |

Preferably, the plastisol 132 is packaged in units in containers 131 which accommodate an average size book cover. Although the fence 61 stretches and contracts, depending upon the page width and the spine thickness of the book, the variation in thickness which occurs by using a standard unit of measure of plastisol is negligible. Hence the plastisol units may be packaged in cans 131 or other containers of a volume sufficient for an average cover, opened when the plastisol is to be poured. Measuring of the plastisol is therefore eliminated.

Various colors of plastisol may be used and these may be the same as or contrasting with the fence.

Still another raw material used in the practice of the method is intermediate strip 133 which is cut to length. Preferably, standard widths of strips are used regardless of the book spine thickness and hence the material must be compatable with and merge into the cover itself. A saturated polyester hot-melt such as United Shoe Machinery Compound 1194 is satisfactory for the intermediate material. This is a linear saturated polyester adhesive. The material must be non-brittle when it cools and must be meltable under heat in order to bond to the paper. As in the case of the plastisol, so in the case of the hot-melt intermediate strip, reference is made to the following technical bulletins, included as exhibits hereto:

TABLE

| Item | Manufacturer's bulletin | Date | Ex. No. |
|---|---|---|---|
| Hot-melt adhesive | B. B. Chemical Div. Thermogrip Bulletin #1194 (USM Corp.). | | 6 |
| Alternate | Eastman Polyester, p. 32 | | 7 |

An alternate supply used with the process is a mechanical means to retain the papers, such as a ring binder loose-leaf device 136. The edge of such device seals to the cover by means of the intermediate strip 133 heretofore described.

An alternate raw material is a disposable or non-disposable mold (not shown) which may be used in place of fence 61 and which may be either pre-decorated or plain. The mold may be made of paper or foil. The cover may be cast in the mold rather than confined within fence 61, and for such purpose the fence is eliminated and the fence-frame 23 is held inoperative.

Still another optional material used is the platen 38 which may be a smooth textured sheet of metal which supports the casting release paper 126, or it may be textured and used without the casting release paper. It may be embossed with ornamentation and with various legends.

METHOD

Figures 8, 9:
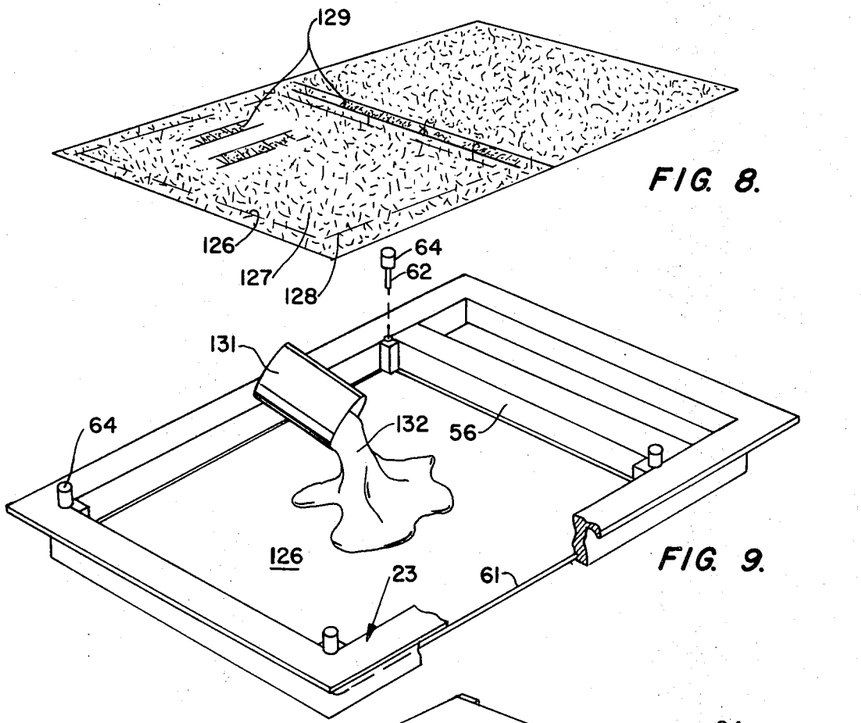
FIGS. 8–15, inclusive, are schematic perspective views illustrating steps in the method of the present invention.
Figure 10:
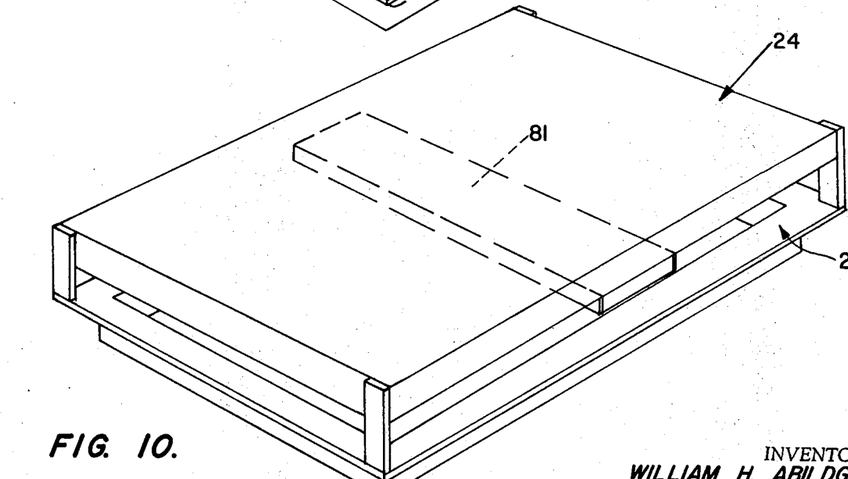
Figures 11, 12, 13, 14:
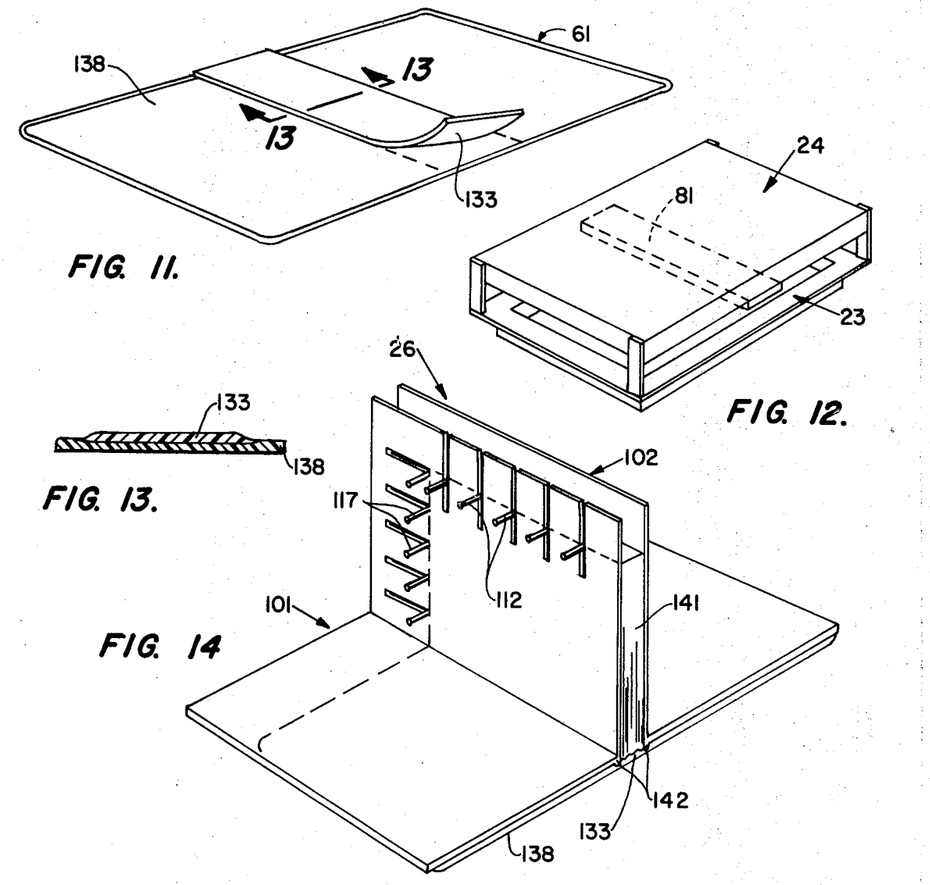

FIG. 8 shows the first step in the practice of one of the methods of the invention wherein a casting release paper 126 is used. Such paper is preferably textured and its left-hand end (i.e., front cover) is silk screen ornamented and various legends 129 in reverse printing may be applied by silk-screening or by transfer. Such casting release paper is placed upon the platen 38 with the front cover material on the left-hand side of the machine.

The next step of the practice of the method is to prepare and apply the fence 61. The movable member 56 of the fence-frame is adjusted so that the fence is of a width dimension which is equal to the width of the front cover, spine and back cover, plus any desired cover overlap. Pins 62 are projected, holding fence 61 within rabbet 59. Fence frame 23 is pivoted down to frictionally retain fence 61 against the surface of the casting release paper 126. The pins 62 are retracted so that they do not protrude in the area which the plastisol will fill. After the pins 62 are retracted the friction of fence 61 against the casting release paper 126 is sufficient to prevent retraction of the fence.

The plastisol 132 is then poured into the opening of the fence-frame 23 on top of casting release paper 126 or platen 38. Since the adjustable pads 33 of base 21 have made platen 38 level, the plastisol flows evenly, filling the space within fence 61 and physically or chemically bonding therewith. A container 131 which has a volume equal to the preferred quantity of plastisol to fill an average book cover is poured, as is shown in FIG. 9.

The next step in the method is to close the top heater member 24 and to energize the top and also the bottom heating coils 39, 78 and optionally coils 82.

The heat of the coils cures the plastisol. The time and temperature are subject to variations caused by size of book and formula used, but for the plastisol described above a temperature of 300–350° F. and a time of 150 to 300 seconds has been found unsatisfactory. When the curing time is completed, the heating coils 39, 78, 82 are de-energized and top heater 24 pivoted away. Next the fence frame 23 is pivoted out of the way, leaving the fence 61 bonded to the flat, cured cover 138.

The next step is to apply to the center of the hot, cured cover 138 an intermediate strip 133 extending across the width of the cover. The top heater 24 is then repositioned and the center heating coils 82 energized, melting the intermediate 133 and the top heater 24 is then pivoted out of the way.

The pages 141 to be bound in the book preliminarily have been installed in clamp 26. Plate 102 has been moved away from plate 101 a distance greater than the spine width. Pins 112 and 117 have been properly located so that the edges of pages 141 are flush with flanges 103 and centered transversely of the machine. Plate 102 is then forced to the left, clamping pages 141 in place.

While the intermediate 133 is still in viscous condition, the page clamp 26 is swung down and the spine edges of pages 141 are forced into the viscous intermediate 133, filing any of the unevennesses in the paper edges and bonding all of the edges to themselves and to the intermediate 131 which has already been bonded to cover 138. The V-shape ridges 106 at the corners of plates 101, 102 form grooves across the cover which serve as hinges. The intermediate 133 merges with cover 138 and thus the excess intermediate, which is occasioned by reason of the fact that a standard width of intermediate is preferably employed, is absorbed into the cover itself. The blower 43 is turned on, cooling the intermediate 133 and the cured plastisol. The clamp 26 being of relatively large mass functions as a heat sink to cooperate with blower 43 in cooling the product.

Figure 15:
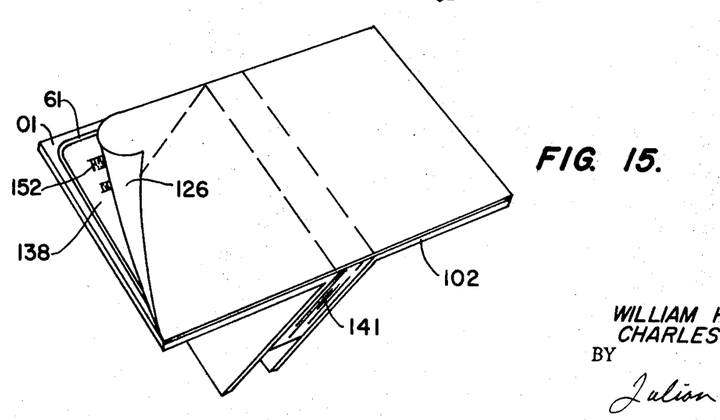

The clamp 26 is then swung up into inoperative position and the casting release paper 126 pulled off the cover 138. The legeneds and ornamentation on the casting release paper have been absorbed into the cover during the curing process (see FIG. 15).

Figures 16, 17, 18:
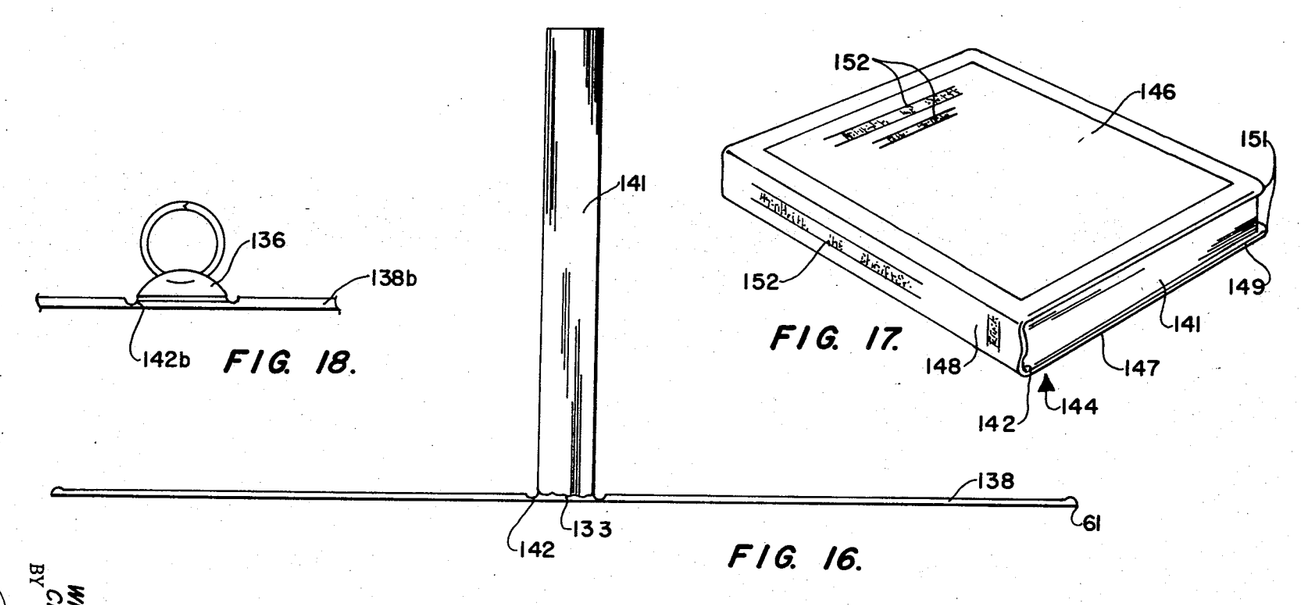
FIG. 16 is an end elevational view of a book formed in accordance with the present invention, showing the cover spread out and the pages upright.
FIG. 17 is a perspective view of a completed book formed in accordance with the present invention.
FIG. 18 is a fragmentary view similar to FIG. 16, showing a loose-leaf binder incorporated in a cover formed in accordance with the present invention.

The book 144 is then completed by releasing pages 141 from the clamp and folding the cover 146 and back 147 at hinge grooves 142, leaving spine 148 therebetween (see FIG. 17).

As an alternate to the method heretofore described, a fixture (not shown) may be attached between the angle plates 101, 102 to receive and retain a ring binder or other loose-leaf page-holding device 136. When the page clamp 26 is swung down upon the melted intemediate 133, the back of the ring binder 136 bonds to cover 138b (see FIG. 18.)

The cover of the completed book 144 has around its entire perimeter a rounded edge 149 which also serves as a reinforcement against tearing and which represents the fence 61 which forms the boundaries of the mold or the plastisol. The corners 151 of the book are also formed with a radius. The texture of the cover 138 is dependent upon the texture 127 of the casting reelase paper 126, or of the platen 38 upon which the cover has been molded. Suitable legends 152 and ornamentation on the front, spine and back have been applied as the reverse of 128, 129 during the molding process.

The spine edges of the pages 141 of the book are bonded to the intermediate 133 and the intermediate is bonded to the inside of cover 138. Unevenness in the size of pages 141 is accommodated by the pliable nature of the intermediate prior to its cooling. The excess width of the intermediate 133 is forced into the cover 138. The hinges 142 are formed immediately adjacent the edges of spine 148 by a decrease in the thickness of the cover occasioned by the ridges 106 in the angle plates 101, 102 being forced into the intermediate 133. However, although the hinges 142 are normally the weakest area in a book cover, because of the reinforcement of the intermediate 133 and also of the fence 61 along the edges, the hinges are strongly reinforced.

The front and back covers are folded inwardly at the hinges and the completed book is shown in FIG. 17. Such a book has a fine leather-like texture and may be flexible or stiff, depending upon the plastisol used. A variety of colors may be produced by choice of the plastisol and a wide variety of surface textures, ornamentation and legends may be applied in the manner heretofore set forth.

ALTERNATE METHOD AND MATERIALS

The above-outlined procedure describes the use of a vinyl plastisol for the cover material and a suitable hot-melt adhesive to bond pages and cover together. Since the essential element is that the cover material be liquid at some stage in the cycle so as to be dimensionally confined by the fence, solid plastic materials 135 can be used provided they will melt and flow out at temperatures not above present casting paper tolerance of 350° F. Many plastics meet this requirement, particularly in lower molecular weight compounds. Included are polymers and copolymers in the polyolefin, polyester, and polystyrene groups. The plastic chosen must adhere to the fence material which can be of a same or dissimilar but compatible material.

If a plastic material for the cover is chosen such that it is also a good adhesive for paper, the intermediate hot-melt adhesive strip described previously is unnecessary. The cover material itself then becomes the glue and binds the paper to itself. An example of a proprietary material which accomplishes this is Eastobond M–3, a polyolefin resin-based, hot-melt adhesive manufactured by Eastman Chemical Products, Inc. Again, as in the case of the plastisol and hot-melt strip, reference is made to a technical bulletin, a copy of which is furnished as an exhibit:

Item: Hot-melt adhesive
Manufacturer's Bulletin: Eastman Technical Data Eastobond M–3, TDS No. R–134.
Date: 1967
Ex. No.: 8

A satisfactory release paper for the cover made in accordance with the above are provided with a vinyl-acrylic top finish or "scuff coat" on them. A satisfactory finish is formulated by Custom Chemicals, 30 Paul Kohner Place, P.O. Box 171, East Paterson, N.J.

Figures 19, 20, 21:
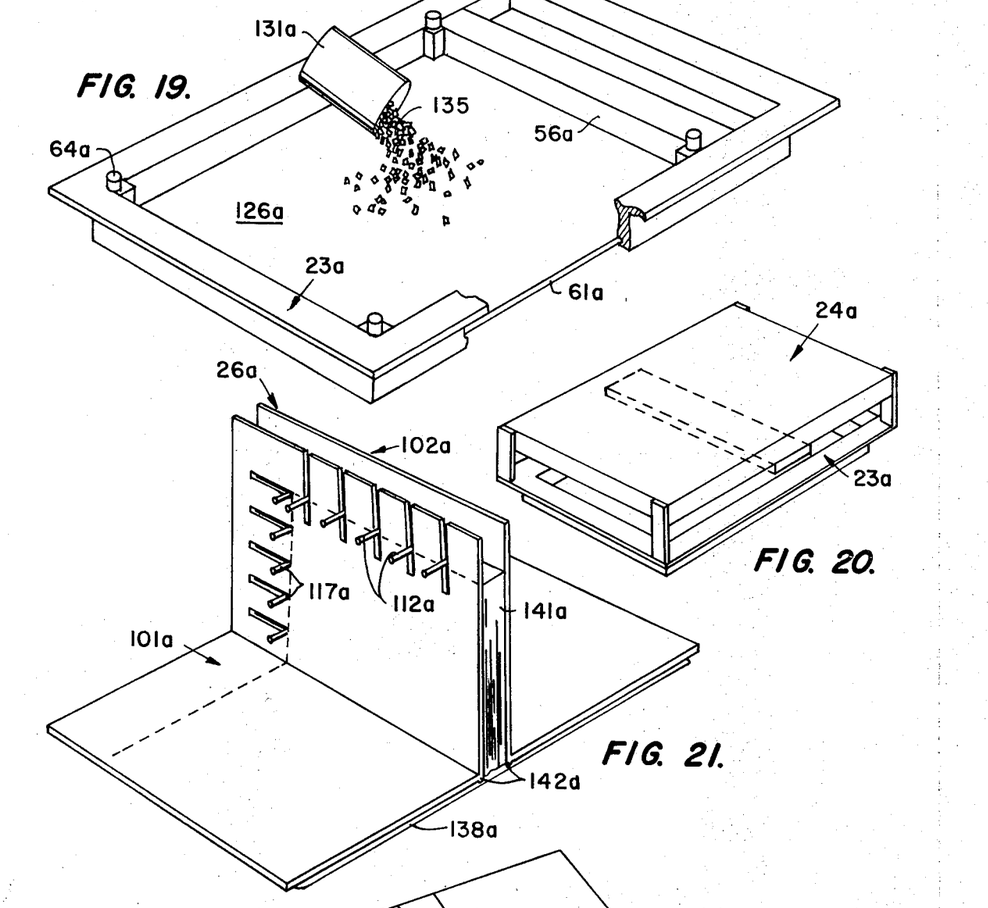
FIGS. 19–22 are schematic perspectvie views similar to FIGS. 9, 10, 14 and 15, respectively, illustrating an alternate method.
Figure 22:
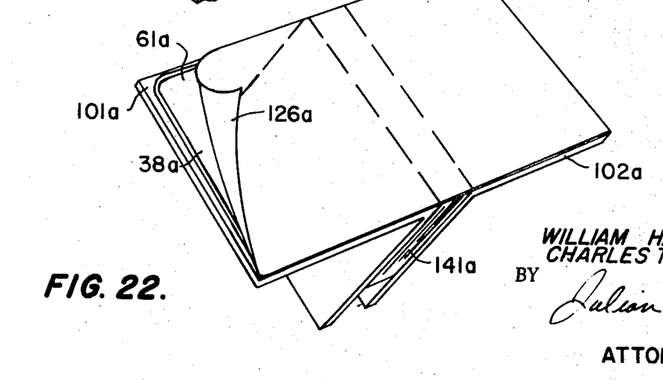

Practice of the method is illustrated in FIGS. 19–22 in which parts of the apparatus corresponding to those shown in FIGS. 9, 10, 14 and 15 are designated by the same reference numerals followed by subscript *a*. Spreading of the plastic granules 135 of a quantity filling a predetermined capacity container 131a is similar to pouring plastisol 132. Heating is shown in FIG. 20, implanting of the page spine in FIG. 21 and removal of the casting release paper in FIG. 22.

What is claimed is:

1. A method of forming a plastic book cover for pages of material comprising confining said pages clamped together with their spine edges exposed, positioning a narrow, boundary-forming fence dimensioned to have a length dimension at least as long as the lengths of said pages and a width dimension at least as long as twice the width of said pages plus the thickness of said spine edges, providing a level surface of a size greater than said fence, forcing said fence into intimate, liquid confining contact with said level surface, adding a plastic material to said level surface within said fence, applying and discontinuing application of heat to form a plastic cover within the boundaries of said fence, and adhering said spine edges to said cover.

2. A method according to claim 1, in which said plastic cover bonds to said fence, said fence forming a marginal edge for said cover.

3. A method according to claim 1, which further comprises depressing said cover parallel to and adjacent opposite sides of said spine to form hinges for said cover.

4. A method according to claim 1, which further comprises applying to said level surface prior to forcing said fence thereagainst a textured casting release paper.

5. A method according to claim 4, which further comprises applying transfers to said casting release paper, said transfers being incorporated in said cover after application of heat.

6. A method according to claim 1, in which said fence is of stretchable material and which further comprises stretching said fence in at least one of its dimensions to proper size prior to forcing said fence into contact with said level surface.

7. A method according to claim 1, which further comprises centering said pages relative to said fence prior to adhering said spine edges to said cover.

8. A method according to claim 1, in which said plastic material is a hot melt adhesive bondable to said pages and to said fence and in which said applying and discontinuing heat first melts said material and then allows said material to solidify.

9. A method according to claim 8, in which said adhering step is performed before said material has completely solidified.

10. A method according to claim 8, in which said material is of a lower molecular weight compound of the group consisting of polymers and copolymers of polyolefins, polyesters and polystyrenes.

11. A method according to claim 1, which further comprises applying to said cover an intermediate strip of a hot melt plastic material characterized by strong paper-to-paper and paper-to-plastic adhesive properties, melting said strip to bond said strip to said cover and then forcing said spine edges into said strip while said strip is still molten.

12. A method according to claim 1, in which said plastic material is a plastisol.

13. A method according to claim 12, in which said plastisol contains a polyvinyl material.

14. A method of forming a plastic loose-leaf book cover comprising positioning a narrow, boundary-forming fence dimensioned of predetermined width and length, providing a level surface of a size greater than said fence, forcing said fence into intimate, liquid-confining contact with said level surface, adding a plastic material to said level surface within said fence, applying and discontinuing application of heat to form a plastic cover within the boundaries of said fence, positioning a loose-leaf binder element adjacent said level surface and adhering the back of said element to said cover.

References Cited

UNITED STATES PATENTS

| | | | |
|---|---|---|---|
| 2,021,214 | 11/1935 | Wilson | 11—2 |
| 2,355,737 | 8/1944 | Krehbiel | 281—29 X |
| 3,088,753 | 5/1963 | Sendor | 281—29 |
| 3,128,484 | 4/1964 | Rogers et al. | 11—2 |
| 3,168,424 | 2/1965 | Sendor | 281—29 X |
| 3,201,145 | 8/1965 | Libby | 281—29 |

LAWRENCE CHARLES, Primary Examiner

U.S. Cl. X.R.

11—2, 3; 281—21